(12) United States Patent
Yoshihisa (10) Patent No.: US 8,014,046 B2
(45) Date of Patent: Sep. 6, 2011

(54) SCANNER DEVICE, PRINTING DEVICE AND SCAN METHOD

(75) Inventor: Yasuhiko Yoshihisa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 970 days.

(21) Appl. No.: 11/900,276

(22) Filed: Sep. 11, 2007

(65) Prior Publication Data

US 2008/0174836 A1  Jul. 24, 2008

(30) Foreign Application Priority Data

Sep. 11, 2006 (JP) ................................. 2006-245172
Sep. 27, 2006 (JP) ................................. 2006-262317

(51) Int. Cl.
*H04N 1/04* (2006.01)
(52) U.S. Cl. ......... 358/496; 358/497; 358/474; 358/498
(58) Field of Classification Search .................. 358/496, 358/497, 474, 498, 505
See application file for complete search history.

(56) References Cited

U.S. PATENT DOCUMENTS

| 6,972,876 | B2 | | 12/2005 | Yokochi | |
| 7,130,091 | B2 | * | 10/2006 | Ishimaru et al. | 358/496 |
| 7,551,331 | B2 | * | 6/2009 | Ishimaru et al. | 358/496 |

FOREIGN PATENT DOCUMENTS

| JP | 2002-176534 | 6/2002 |
| JP | 2004-138836 | 5/2004 |
| JP | 2004-212545 | 7/2004 |
| JP | 2004-282561 | 10/2004 |
| JP | 2005-094688 | 4/2005 |

* cited by examiner

*Primary Examiner* — Houshang Safaipour
(74) *Attorney, Agent, or Firm* — Nutter McClennen & Fish LLP; John J. Penny, Jr.

(57) ABSTRACT

Disclosed herein is a scanner device which scans a predetermined scan object and generates image data, the scanner device including: an image sensor which converts an optical image of the scan object into corresponding image data; a movement unit which moves a carriage having the image sensor in a sub-scan direction; a first control unit which controls the movement unit by a first control process; a second control unit which controls the movement unit by a second control process different from the first control process; and a selection unit which selects the first or the second control unit according to setting contents relating to a scan.

6 Claims, 10 Drawing Sheets

MULTI-COLOR MODE

| | | MAIN SCAN RESOLUTION | | |
|---|---|---|---|---|
| | | 1200 dpi | 600 dpi | 300 dpi |
| SUB-SCAN RESOLUTION | 75 dpi | — | — | PID CONTROL |
| | 100 dpi | — | — | PID CONTROL |
| | 150 dpi | PID CONTROL | — | PID CONTROL |
| | 200 dpi | — | — | PID CONTROL |
| | 300 dpi | — | PID CONTROL | PID CONTROL |
| | 400 dpi | — | — | PID CONTROL |
| | 600 dpi | EXTREMELY LOW-SPEED CONTROL | PID CONTROL | PID CONTROL |
| | 1200 dpi | EXTREMELY LOW-SPEED CONTROL | EXTREMELY LOW-SPEED CONTROL | — |
| | 2400 dpi | EXTREMELY LOW-SPEED CONTROL | — | — |

FIG. 6B

MONOCHROMATIC MODE

| | | MAIN SCAN RESOLUTION | | |
|---|---|---|---|---|
| | | 1200 dpi | 600 dpi | 300 dpi |
| SUB-SCAN RESOLUTION | 75 dpi | — | — | PID CONTROL |
| | 100 dpi | — | — | PID CONTROL |
| | 150 dpi | PID CONTROL | — | PID CONTROL |
| | 200 dpi | — | — | PID CONTROL |
| | 300 dpi | — | PID CONTROL | PID CONTROL |
| | 400 dpi | — | — | PID CONTROL |
| | 600 dpi | PID CONTROL | PID CONTROL | PID CONTROL |
| | 1200 dpi | EXTREMELY LOW-SPEED CONTROL | EXTREMELY LOW-SPEED CONTROL | — |
| | 2400 dpi | EXTREMELY LOW-SPEED CONTROL | — | — |

SCANNER DEVICE, PRINTING DEVICE AND SCAN METHOD

BACKGROUND

1. Technical Field

The present invention relates to a scanner device, a printing device and a scan method.

2. Related Art

A scanner device for scanning a predetermine scan object (hereinafter, referred to as an "original") to prepare image data has been known (see JP-A-2004-282561). A carriage of this scanner device has a light source for emitting light. The light emitted from the light source is irradiated onto the original so as to form an irradiation region (hereinafter, referred to as a scan region). The light is reflected from the scan region and is incident to an image sensor. The image sensor stores the reflected light in a predetermined time and converts the stored light into an electrical signal such that image data is generated at a portion of the original according to the scan region which is moved in the predetermined time for storing the reflected light. The carriage is transported in a scan direction by a carriage transporting mechanism using a predetermined motor as a driving source and the scan region is moved along with the carriage.

The scanner device sets a plurality of lines having density corresponding to resolution in the scan direction specified by a user in a scan region of the original. These lines are formed in a band shape and are set parallel to the scan direction. In the scanner device, when the carriage is transported in the scan direction, each line is moved to the scan region. At this time, in the scanner device, the image sensor starts the storage of the reflected light when the scan region reaches a start time of each line and the image sensor finishes the storage of the reflected light when the scan region reaches an end point of each line, such that the image sensor generates image data of the line (hereinafter, referred to as line image data). In this case, in the scanner device, the motor is driven so as to transport the carriage in the scan direction such that a time in which the scan region passes through each line becomes a predetermined time in each line.

When the carriage is driven, a stepping motor is generally used. However, the stepping motor has larger operating sound, compared with a DC motor.

Accordingly, the carriage may be driven by the DC motor. A rotation speed of the motor is controlled by controlling a driving voltage applied to the motor. For example, in order to rotate the DC motor at a very low speed, a very low driving voltage should be applied to the motor. However, since a torque obtained by the driving voltage is smaller than frictional force, a voltage range (dead zone) in which the motor is not rotated occurs. If the motor for transporting the carriage is the DC motor and the very low driving voltage is applied to the DC motor in order to improve reading resolution, the driving voltage may be in the dead zone and thus the DC motor may not be rotated.

SUMMARY

An advantage of some aspects of the invention is that it provides a scanner device, a printing device and a scan method, which are capable of driving a carriage at a desired speed with low noise.

According to an aspect of the invention, there is provided a scanner device which scans a predetermined scan object and generates image data, the scanner device including: an image sensor which converts an optical image of the scan object into corresponding image data; a movement unit which moves a carriage having the image sensor in a sub-scan direction; a first control unit which controls the movement unit by a first control process; a second control unit which controls the movement unit by a second control process different from the first control process; and a selection unit which selects the first or the second control unit according to setting contents relating to a scan.

The movement unit may include a DC motor for moving the carriage in the sub-scan direction. By this configuration, it is possible to provide a scanner device having small operating sound and low noise.

The first control unit may perform a control process according to a position of the carriage, the second control unit may perform a control process according to the position and speed of the carriage; and the selection unit may select the first control unit when the motor included in the movement unit moves the carriage at a predetermined speed or less and select the second control unit when the motor moves the carriage at less than the predetermined speed. By this configuration, since the first and second control units are selected according to the speed, it is possible to control the carriage by an optimal control process according to the speed.

The first control unit may control the motor included in the movement unit to be intermittently rotated; the second control unit may control the motor included in the movement unit to be continuously rotated; and the selection unit may select the first control unit when the motor included in the movement unit moves the carriage at a predetermined speed or less and select the second control unit when the motor moves the carriage at less than the predetermined speed. By this configuration, it is possible to intermittently drive the motor even at a low speed equal to or less than a dead zone and to efficiently control the motor by the second control unit when the carriage is moved at a high speed.

The selection unit may select the first and second control units according to a monochromatic/multi-color mode or resolution of the image data to be obtained. By this configuration, it is possible to select an optimal control unit according to the resolution or the monochromatic/multi-color mode and to read the scan object.

A printing device according to the invention includes the scanner device. By this configuration, it is possible to provide a printing device capable of driving the carriage at a desired speed.

According to another aspect of the invention, there is provided a scan method which scans a predetermined scan object and generates image data, the method including: selecting a first control process and a second control process different from the first control process according to setting contents relating to a scan and performing a control process which moves a carriage including an image sensor for converting an optical image of the scan object into corresponding image data. By this configuration, it is possible to provide a scan method capable of driving the carriage at a desired speed with low noise.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

Figure 1:
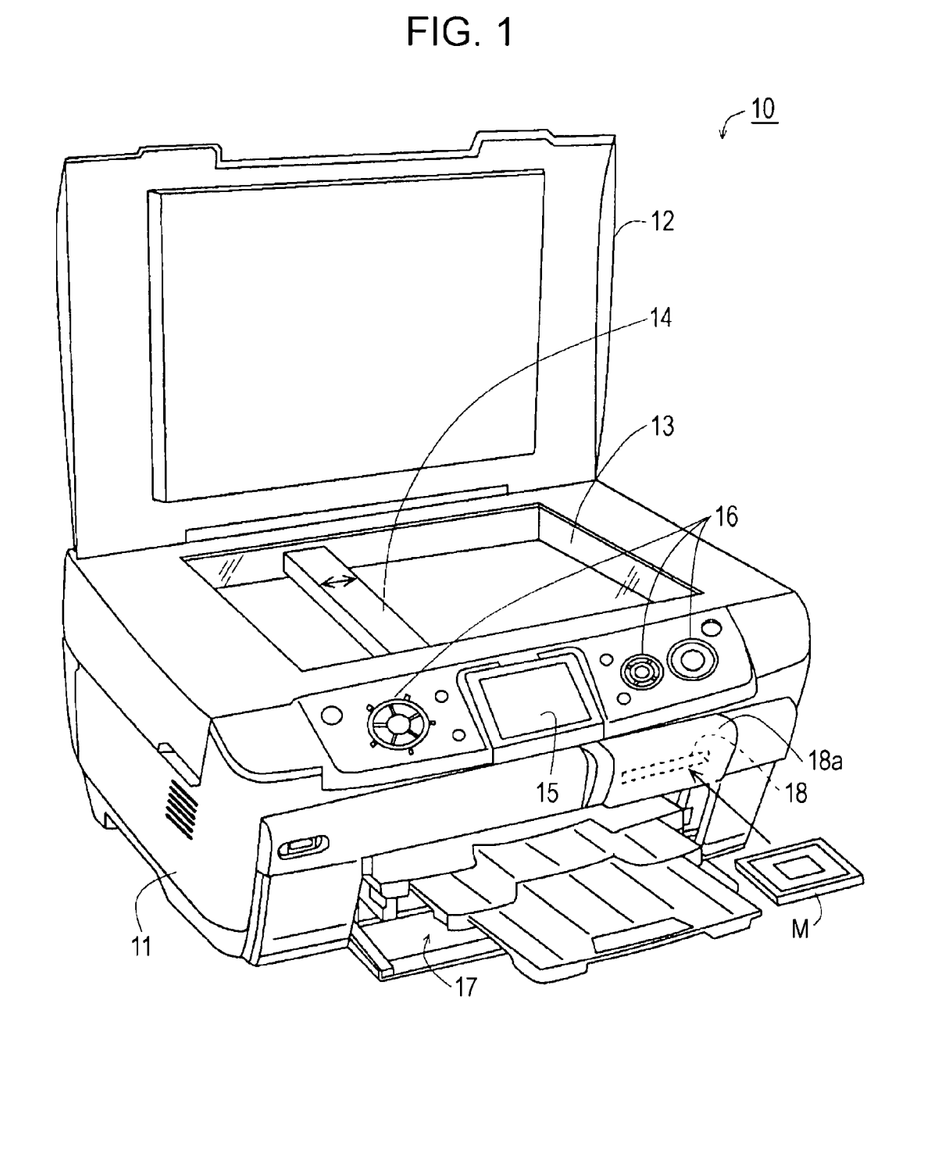
FIG. 1 is a view showing the configuration of a printing device according to an embodiment of the invention.

FIG. 1 is a perspective view showing the configuration of a printing device 10 using a scanner device according to an embodiment of the invention. As shown in FIG. 1, the printing device 10 is a multifunctional printing device including a scanner function, a printing function and a copy function. Here, the printing device 10 includes a case 11 for covering the device, a feeding device (not shown) for feeding a printing sheet, a scanner device including transparent contact glass 12, on which an original is mounted, and a carriage 14, and a printing unit (not shown) for printing the printing sheet. In addition, the operation of the scanner device will be described as the operation of the printing device 10. The scan method according to the invention will be described as the operation of the printing device 10.

The case 11 is a substantially rectangular box shape and an openable cover 12 is provided at the upper side of the case 11. When the cover 12 is opened, the contact glass 13 on which the original is mounted appears. A carriage 14 including an image sensor is provided inside the contact glass 13. The carriage 14 is moved in a sub-scan direction such that information printed on an original is read as image data. The scanner device is a flatbed type (original fixing type) scanner for reading a fixed original while the image sensor is moved in the sub-scan direction.

A liquid crystal display (LCD) 15 and a variety of operation buttons 16 are provided at a central portion of a front surface of the case 11. The LCD 15 displays a menu, operation contents, an operation status, and error contents of the printing device 10, and one of the operation buttons 16 is pressed when the menu of the printing device 10 is selected.

The case 11 includes an ejection port 17 which is provided at a lower side of the front surface and ejects a printing sheet. A card slot 18 is provided at a right side of the front surface of the case 11, and a memory card M for recording image data photographed by a digital camera (not shown) is detachably contained. In this embodiment, a cover portion 18a is provided on the card slot 18 and is opened and closed when the memory card M is inserted. The memory card M stores image data compressed by a JPEG format as an irreversible compression type or a TIFF format as a reversible compression type.

The feeding device (not shown) is provided at the rear surface side of the case 11, stores printing sheets, and feeds the printing sheets into the printing device 10 one by one.

Figure 2:
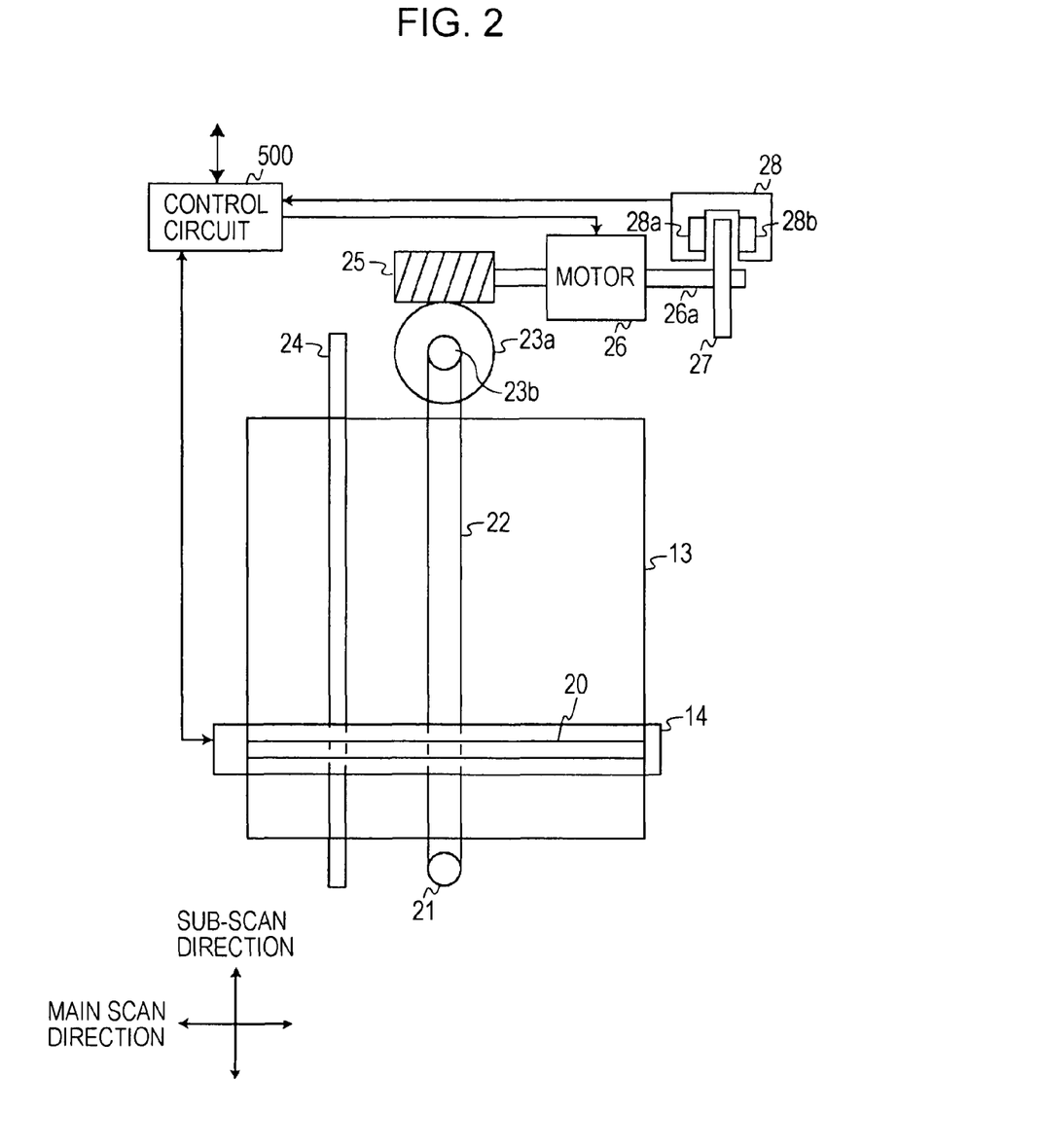
FIG. 2 is a view showing the configuration of a scanner device of the printing device shown in FIG. 1.

FIG. 2 is a view showing the configuration of the scanner device of the printing device shown in FIG. 1. A carriage transporting mechanism includes a DC motor 26 which is a movement device, a worm gear 25 adhered to an output shaft of the DC motor 26, a spur gear 23a which is engaged with the worm gear 25 and is rotated at a predetermined deceleration rate, a pulley 23b adhered to the spur gear 23a, a timing belt 22 which is stretched between the pulley 23b and a pulley 21 such that a portion thereof is fastened to the carriage 14, and a guide rail 24 for transporting the carriage 14 in the sub-scan direction. The carriage 14 is transported in the sub-scan direction along the guide rail 24 when the DC motor 26 is rotated and the timing belt 22 is driven. Hereinafter, a movement distance of the carriage 14 when the DC motor 26 is rotated one time is referred to as a movement distance L.

The carriage 14 includes the image sensor 20. The image sensor 20 is a contact image sensor (CIS) and includes a charge coupled device (CCD) (not shown) having light-receiving elements which are arranged in the scan direction with predetermined pixel density, lens (not shown) corresponding to the light-receiving elements, and a light-emitting diode (LED) (not shown) for irradiating light of R, G and B onto a surface of an original. The light-receiving elements receive light reflected from the surface of the original, store charges and output the charges as a signal.

An encoder 28 is a rotary encoder and includes a disk 27 adhered to the output shaft 26a of the DC motor 26, and a light-emitting diode 28a and a photodiode 28b with the disk 27 inserted therebetween.

The disk 27 has slits (not shown) which are formed with a predetermined gap interposed therebetween along the circumference thereof, and the photodiode 28b can receive the light emitted from the light-emitting diode 28a through the slits. Accordingly, when the DC motor 26 is rotated and the disk 27 is rotated, the photodiode 28b receives the light emitted from the light-emitting diode 28a at the slit portions of the disk and does not receive the light at portions of the disk excluding the slits. As a result, the photodiode 28b generates pulses (hereinafter, referred to as "encoder pulses") of the number corresponding to the number of rotations of the DC motor 26 and the encoder 28 outputs the pulses.

Although not shown, two sets of the light-emitting diode 28a and the photodiode 28b are provided and the photodiodes 28b output the encoder pulses whose phases are shifted by π/2. Accordingly, an encoder control unit 512 can detect a rotation direction of the DC motor 26 by a variation in phase of the encoder pulses output from the encoder 28.

Figure 3:
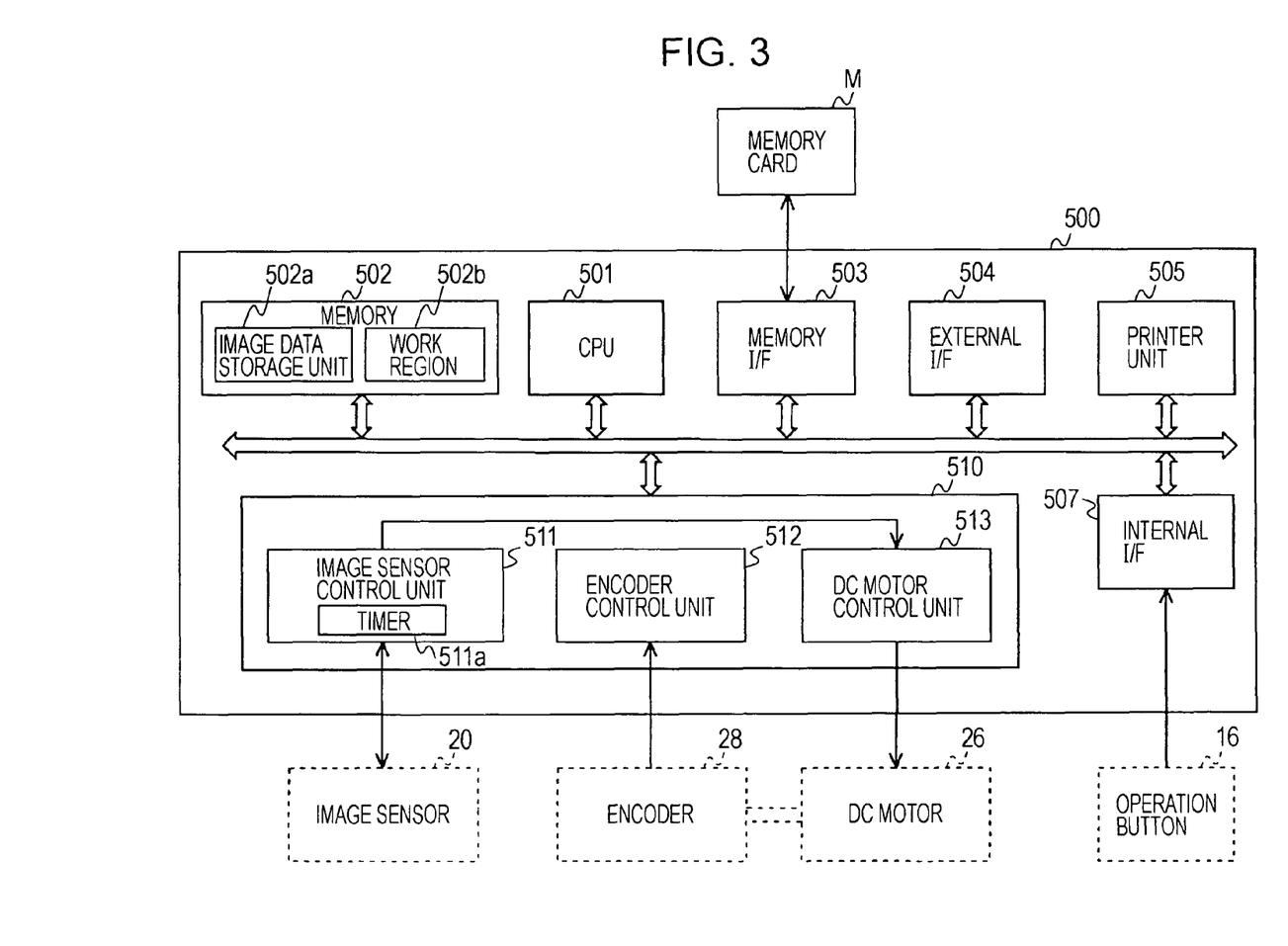
FIG. 3 is a view showing in detail the configuration of a control circuit.

FIG. 3 is a schematic view showing the configuration of a control circuit 500 shown in FIG. 2. The control circuit 500 mainly includes a CPU 501, a memory 501, a memory interface (I/F) 502, an external I/F 504, a printer unit 505, an internal I/F 507, and an application specified integrated circuit (ASIC) 510 which is a predetermined integrated circuit.

The memory 502 is configured by a read only memory (ROM) and a random access memory (RAM) and includes an image data storage unit 502a for storing image data generated by reading an original and a work region 502b for performing an image data generating operation and an operation for developing a predetermined program.

The CPU 501 which is a selection device controls the printing device 10 by executing a predetermined program stored in the memory 502 on the work region 502b. The CPU 501 receives resolution information indicating original reading resolution (dpi), a color/monochrome information, and scan region information indicating a scan region of an original, all of which are input by allowing a user to operate the operation buttons 16, through the internal I/F 507 and sends them to the ASIC 510. The resolution information includes resolution in a main scan direction and resolution in a sub-scan direction.

The memory I/F 503 is an interface which is used to read image data recorded in the memory card M and to write image data in the memory card M. The external I/F 504 is an interface for connection with a personal computer or another image input device (e.g., a digital camera). The printer unit 505 sprays color ink from a nozzle according to image data supplied from the CPU 501 and prints a color image on a printing sheet. The internal I/F 507 is an interface for inputting information generated by allowing the user to operate the operation buttons 16.

The ASIC 510 is configured by the predetermined integrated circuit, includes an image sensor control unit 511, an encoder control unit 512, and a DC motor control unit 513, and executes a reading process. The image sensor control unit 511 controls the image sensor 20 such that the time for storing the reflected light becomes a suitable storage time T, and receives and converts an electrical signal output from the image sensor 20 into a gradation value. The image sensor control unit 511 generates image data of an original from line image data of each line.

The image sensor control unit 511 includes a timer 511a. The image sensor control unit 511 measures a time using the timer 511a to control a turn-on time of the LED or a suitable charge storage period.

The encoder control unit 512 detects the encoder pulses output from the encoder 28 and detects the movement distance of the carriage 14 in the scan direction, by the number of encoder pulses, the number of slits of the disk 27, and the movement distance L. The encoder control unit 512 detects the rotation direction of the DC motor 26. Accordingly, the encoder control unit 512 can detect the position of the carriage 14 relative to any position in the scan direction, on the basis of the rotation direction of the DC motor 26 and the movement distance of the carriage 14 (on the basis of the number of encoder pulses).

The DC motor control unit 513, which is a first control device and a second control device, supplies DC power supplied from a power source (not shown) to the DC motor 26 and controls the rotation speed of the DC motor 26 by controlling a supplied voltage or current. The DC motor control unit 513 controls the driving voltage (or the driving current) using a pulse width modulation (PWM) control method. That is, the DC motor control unit 513 turns on/off a power control transistor (not shown) in a predetermined switching period (e.g., 50 μs) and varies a ratio of an ON period to the switching period (duty ratio) according to the driving voltage or the driving current. When the duty ratio is decreased, the ON time is decreased and thus the driving voltage (or the driving current) is decreased. In contrast, when the duty ratio is increased, the ON time is increased and thus the driving voltage (or the driving current) is increased. The DC motor 26 may be driven by controlling any one of the voltage and the current. Hereinafter, a case where the voltage is controlled will be described.

Figure 4:
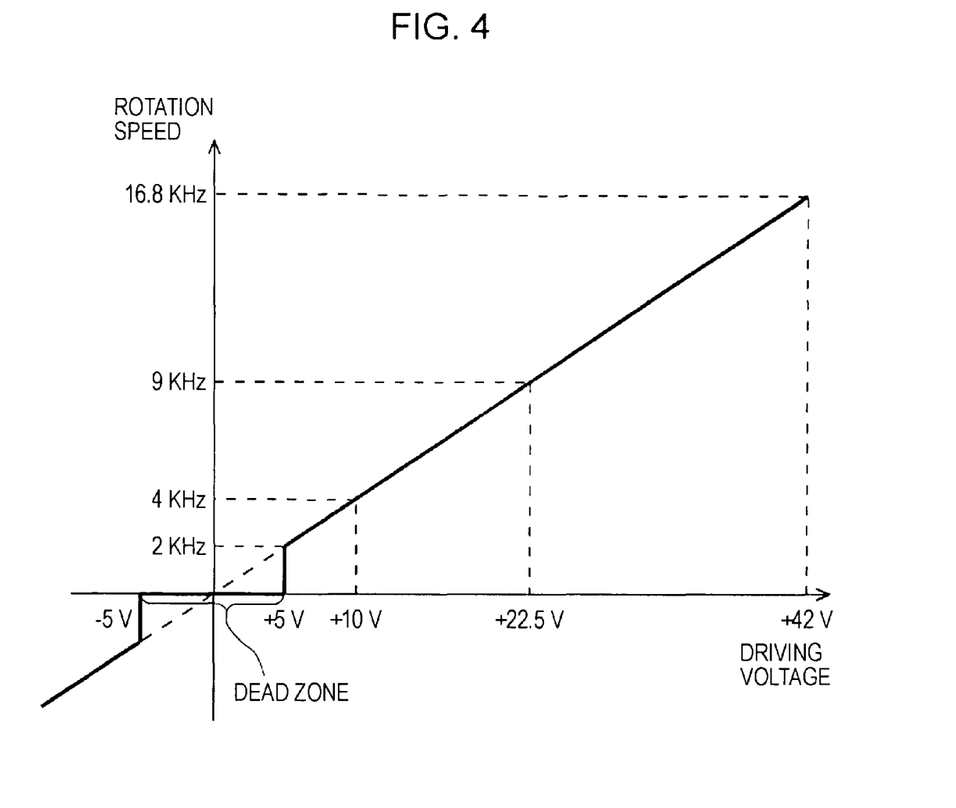
FIG. 4 is a view showing a relationship between a rotation speed and a voltage applied to a DC motor.

FIG. 4 is a graph showing a relationship the driving voltage and the rotation speed of the DC motor 26. In the graph shown in FIG. 4, a horizontal axis indicates the driving voltage and a vertical axis indicates the rotation speed. For convenience of description, a range in which the driving voltage is less than −5 V will be partially omitted.

Since the number of encoder pulses output from the encoder 28 is proportional to a rotation amount of the DC motor 26, the number of encoder pulses output from the encoder 28 for 1 second (encoder pulse frequency) is proportional to the rotation amount of the DC motor 26 for 1 second. Accordingly, in the present embodiment, instead of a revolution per minute (rpm) which is generally used as a rotation speed of the DC motor 26, the encoder pulse frequency (Hz) is used.

The DC motor 26 is normally rotated in a range in which the driving voltage is greater than 0 V and is reversely rotated in a range in which the driving voltage is less than 0 V. Hereinafter, a range in which the driving voltage is greater than 0 V, that is, the DC motor 26 is normally rotated, will be described.

As shown in FIG. 4, in a range in which the driving voltage is equal to or greater than +5 V, the rotation speed of the DC motor 26 is increased as the driving voltage is increased. However, in a range in which the driving voltage is less than +5 V, the rotation speed of the DC motor 26 is 0 and the DC motor 26 is not rotated even when the driving voltage is increased. This is because the DC motor 26 cannot obtain torque with excellent frictional force if the driving voltage is in a range from −5 V to +5 V (dead zone).

Now, a relationship between the reading resolution in the sub-scan direction and the rotation speed of the DC motor 26 in the scanner device will be described. Since the scanner device reads an original while the image sensor 20 is moved in the sub-scan direction, the image sensor 20 should be moved at a speed according to specified resolution and a color mode. For example, if the color mode is a monochromatic mode and the resolution in the sub-scan direction is 4800 dpi, the image sensor 20 should be moved in a period corresponding to 4800 (lines) per inch×"suitable charge storage time". If the color mode is a multicolor mode and the resolution in the sub-scan direction is 4800 dpi with respect to R, G and B, the image sensor 20 should be moved in a period corresponding to 4800 (lines) per inch×"suitable charge storage time"×3.

Here, the term "suitable charge storage period" indicates a predetermined ideal period for output a signal of one pixel with respect to R, G and B in a period (charge storage period) in which the light-receiving elements of the CCD receive light and store charges. If a deviation in charge storage period occurs, a deviation in color of the read image occurs. Accordingly, in the scanner device, the charges are stored only in the suitable charge storage period.

Meanwhile, if the reading resolution in the sub-scan direction is increased, the number of lines to be read per inch is also increased. Accordingly, even when the reading resolution in the sub-scan direction is increased, the movement speed of the image sensor 20 should be decreased in order to allow the light-emitting elements to store the charges only in the suitable charge storage period.

For example, if the resolution in the sub-scan direction is 9600 dpi, the image sensor 20 needs to be moved in a period corresponding to 9600 (lines) per inch×"suitable charge storage time". Thus, the movement speed of the image sensor 20 should be half the speed of the image sensor 20 in the case where the resolution is 4800 dpi.

Such a relationship is established even in the resolution in the main scan direction. Maximum resolution in the main scan direction is determined by arrangement density of the light-receiving elements of the CCD in the main scan direction. For example, if 1200 light-receiving elements per inch are arranged, maximum resolution in the main scan direction is 1200 dpi. If the resolution in the main scan direction is changed, charges output from the plurality of light-receiving elements are added. That is, the resolution is made ½ by adding the charges from two light-receiving elements arranged in the main scan direction. For example, in an image sensor in which the resolution in the main scan direction is 1200 dpi, the resolution becomes 600 dpi by adding the outputs from two light-receiving elements. When the charges from a plurality (n) of light-emitting elements are added, the suitable charge storage period needs to be 1/n such that the charge amount after adding is not greater than the maximum charge amount, because an allowable maximum charge amount of a circuit is previously decided. Accordingly, in a case where the resolution in the main scan direction is high, the movement speed of the image sensor 20 should be decreased, because suitable charge storage period is increased compared with a case where the resolution in the main scan direction is low.

If the color mode is the multicolor mode, the LED is turned on in order of R, G and B and the image sensor 20 receives the reflected light of the light sources of respective colors and converts the light into image data. In contrast, in the monochromatic mode, a one-color (for example, G) LED is turned on such that scanning is performed. Accordingly, in the multicolor mode, the movement speed of the image sensor 20 should be decreased, because the suitable charge storage period needs to be three times that in the monochromatic mode.

In order to move the image sensor 20 at a lower speed, the carriage 14 should be transported at a lower speed. Accordingly, the DC motor 26 should be rotated at a lower rotation speed.

Accordingly, in a case of increasing the resolution in the sub-scan direction and the resolution in the main scan direction or perform the scan in the multicolor mode, the DC motor 26 should be rotated at a lower rotation speed. The detailed relationship between the scan setting and the rotation speed of the DC motor 26 is previously obtained by measurement.

For example, in the resolution in the sub-scan direction, as shown in FIG. 4, in the present embodiment, the driving voltage should be +5 V in order to rotate the DC motor 26 with the encoder pulse frequency of 2 KHz.

When the driving voltage is greater than +5 V, the rotation speed of the DC motor 26 is increased and, as a result, the resolution in the sub-scan direction is decreased. For example, as shown in FIG. 4, if the driving voltage is +10 V, the rotation speed of the DC motor 26 is 4 KHz.

Meanwhile, in order to decrease the number of rotations of the DC motor 26 to be lower than 2 KHz, the driving voltage should be lower than +5 V. However, as described above, since the DC motor 26 has the dead zone of −5 V to +5 V, the DC motor 26 is not rotated if the driving voltage is less than +5 V. Accordingly, in the number of rotations of 2 KHz, the DC motor 26 cannot be rotated.

Accordingly, in the present embodiment, in the number of rotations of less than 2 KHz, an extremely low-speed rotation process is performed such that the DC motor 26 is rotated. Meanwhile, when the original is read with resolution of 2 KHz or more, the DC motor 26 is rotated by a proportional integral differential (PID) control method. Hereinafter, a case of selecting such a control method according to setting contents and driving the DC motor 26 will be described.

Figure 5:
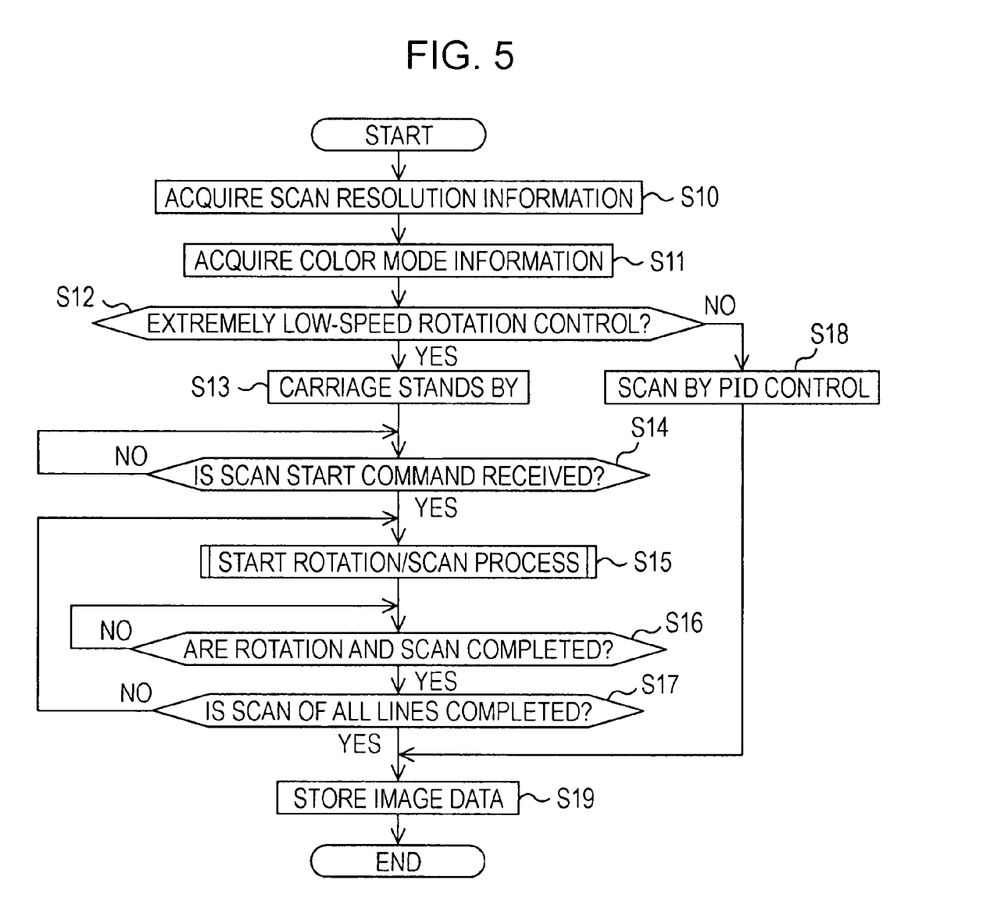
FIG. 5 is a flowchart showing an operation of the printing device shown in FIG. 4.

A user mounts an original on the contact glass 13 shown in FIG. 1, operates the operation buttons 16 or an input device of a personal computer (not shown) connected through the external I/F 504 to specify the resolution in the main scan direction, the resolution in the sub-scan direction, the color mode and the read region. Accordingly, a read operation starts. Then, in the printing device 10, the following process shown in FIG. 5 is performed.

Step S10: The CPU 501 acquires information about the resolution in the main scan direction and the resolution in the sub-scan direction which are input by the operation buttons 16 or the personal computer. For example, information in which the resolution in the main scan direction is 1200 dpi and the resolution in the sub-scan direction is 2400 dpi is acquired.

Instead of direct input of the resolution, for example, three modes "beautiful", "general" and "fast" may be prepared as the scan mode and the user may be allowed to select any one from these modes at the time of the scan such that the resolution in the main scan direction and the resolution in the sub-scan direction corresponding to the selected scan mode are acquired from, for example, the memory 501. According to this method, the user can easily select the resolution according to an object.

The resolution may be set according to the type of the used original. For example, if the original is a transmissive original (film or the like) or a picture, high resolution may be automatically selected and, if the original is plain paper, low resolution may be automatically selected. Alternatively, the resolution may be selected according to a combination of the type of the original and the scan mode. For example, if the type of the original is selected, the number of candidates of the resolution is reduced. Then, any one of the scan modes including "beautiful", "general" and "fast" is selected from the reduced number of candidates such that the resolution is determined. The above description relates to a main scan for reading the image data. In a pre-scan, since it is sufficient that only brief information about an image is acquired, the CPU 501 automatically selects low resolution.

The "setting contents relating to the scan" according to an aspect of the invention may be contents set by the user or contents which are automatically set by the printing device 10 (for example, the resolution of the above-described pre-scan).

Step S11: The CPU 501 acquires information about the color mode which is input by the operation buttons 16 or the personal computer. For example, the CPU 501 acquires information indicating that the color mode is the multicolor.

Step S12: The CPU 501 determines whether the extremely low-speed rotation control method or the PID control method is selected by referring to a table stored in the memory 502. In more detail, the memory 502 stores the table shown in FIG. 6. An upper side of FIG. 6 indicates a relationship between the resolution in the main scan direction and the resolution in the sub-scan direction and the control contents when the color mode is set to the multicolor mode. A lower side of FIG. 6 indicates a relationship between the resolution in the main scan direction and the resolution in the sub-scan direction and the control contents when the color mode is set to the monochromatic mode. In this example, in the multicolor mode table, the extremely low-speed rotation control method is selected when the resolution in the main scan direction is 1200 dpi and the resolution in the sub-scan direction is 600 dpi to 2400 dpi and when the resolution in the main scan direction is 600 dpi and the resolution in the sub-scan direction is 1200 dpi. The PID control method is selected when the resolution in the main scan direction is 300 dpi and the resolution in the sub-scan direction is 75 dpi to 600 dpi, when the resolution in the main scan direction is 600 dpi and the resolution in the sub-scan direction is 300 dpi or 600 dpi, and when the resolution in the main scan direction is 1200 dpi and the resolution in the sub-scan direction is 150 dpi. The residual cases indicate that the combination of the resolutions cannot be selected and are denoted by "−". In contrast, the monochromatic mode table is equal to the multicolor mode table in that the case where the resolution in the main scan direction is 1200 dpi and the resolution in the sub-scan direction is 600 dpi is changed from the extremely low-speed control method to the PID control method.

Figure 6A:
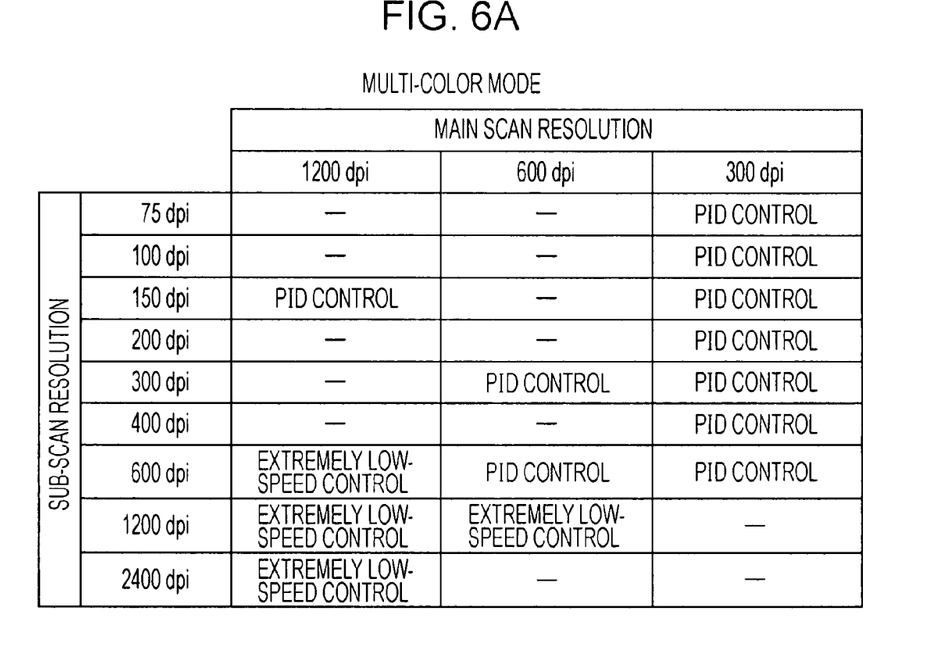
FIG. 6 is a view showing a relationship between resolution and a control method.
Figure 6B:
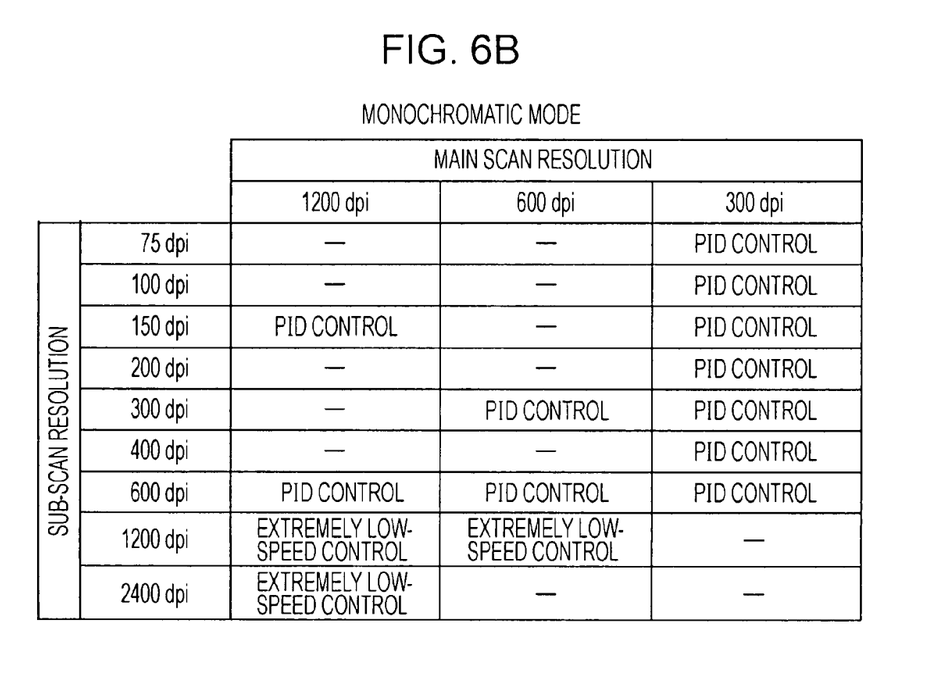

The tables shown in FIG. 6 are only exemplary and other table may be used.

Step S13: The DC motor control unit 513 moves the carriage 14 to a read start position according to the specified size of the original. The movement of the carriage 14 will be omitted for convenience of description.

Step S14: The CPU 501 determines whether a scan start command is received from the operation buttons 16 or the personal computer (not shown). The process progresses to a step S15 if the scan start command is received and repeatedly performs the same process if the scan start command is not received.

Step S15: The CPU 501 rotates the DC motor 26 by one line and performs the scan of one line by the image sensor 20. In more detail, the CPU 501 supplies a command to the DC motor control unit 513 and moves the carriage 14 by one line using the extremely low-speed rotation control method. The CPU 501 supplies a control signal to the image sensor control unit 511, turns on the LEDs of R, G and B, and performs a process of converting the reflected light into image data and reading the image data. Accordingly, the original is scanned by one line and the corresponding image data is generated and output. The method of controlling the image sensor 20 will be described later with reference to FIG. 8 and the method of controlling the DC motor 26 will be described later with reference to FIG. 10.

Step S16: The CPU 501 determines whether the rotation of the DC motor 26 of one line and the scan of one line are completed by the image sensor 20. If the rotation and the scan are completed, the process progresses to a step S17 and, if the rotation and the scan are not completed, the same process is repeatedly performed. As described below, since a time necessary for the rotation of one line is set to be less than the scan of one line, the scan is completed after a lapse of a predetermined time from the completion of the rotation of one line, it is determined that the rotation and the scan of one line are completed, and a process for a next line starts. However, the time necessary for the rotation may be greater than the time necessary for the scan due to any factor. Accordingly, even in such a case, in order to perform a normal operation, in the step S16, the process for the next line is performed after both the rotation and the scan are completed.

Step S17: The CPU 501 determines whether the scan of all lines configuring a region to be scanned is completed. If the scan is completed, the process progresses to a step S19 and, if the scan is completed, the process returns to the step S15 and the same process is repeatedly performed.

Step S18: The DC motor control unit 513 rotates the DC motor 26 at a constant speed on the basis of the PID control method and the scan is performed by the image sensor 20 such that data of the all lines of the scan region is read and converted into the image data.

Figure 7:
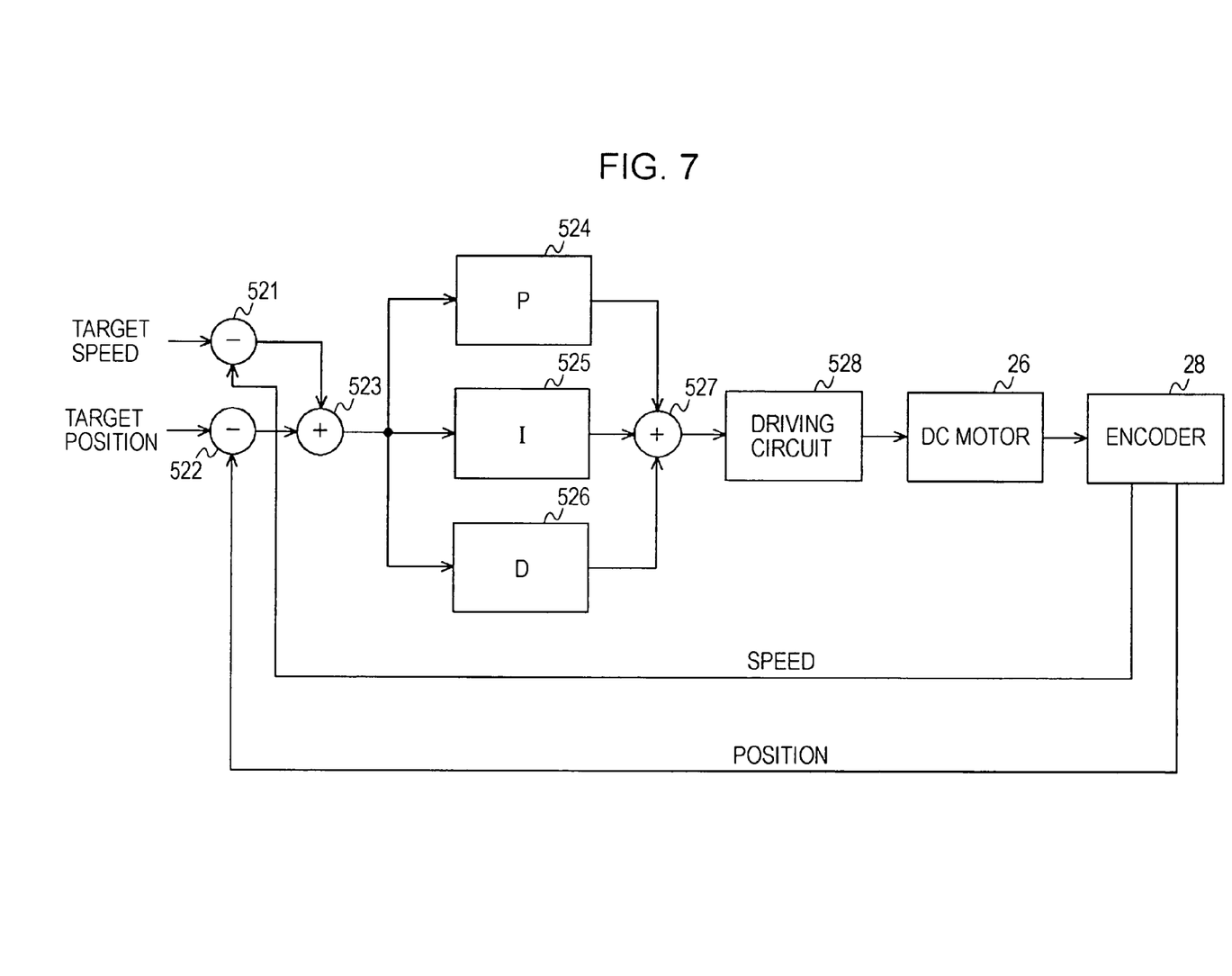
FIG. 7 is a block diagram showing a PID control method.

FIG. 7 shows a functional block formed in the DC motor control unit 513 when the PID control method is performed. In FIG. 8, a subtraction circuit 521 calculates a difference between a target speed (target movement speed) of the carriage 14 supplied from the CPU 501 and speed information generated on the basis of the encoder pulses output from the encoder 28 and supplies the difference to an adding circuit 523. A subtraction circuit 522 calculates a difference between the target speed of the carriage 14 supplied from the CPU 501 and positional information generated on the basis of the encoder pulses output from the encoder 28 and supplies the difference to the adding circuit 523. A multiplying circuit for multiplying the outputs of the subtraction circuit 512 and 522 by a predetermined number may be provided.

The adding circuit 523 adds the signals output from the subtraction circuits 521 and 522 and outputs the added signal. A proportional element (P) 524 multiplies the output of the adding circuit 523 by a predetermined number and outputs the multiplied signal. An integral element (I) 525 integrates the output of the adding circuit 523 and outputs the integrated signal. A differential element (D) 526 differentiates the output of the adding circuit 523 and outputs the differentiated signal. An adding circuit 527 adds the outputs of the proportional element 524, the integral element 525, and the differential element 526 and supplies the added signal to a driving circuit 528. The driving circuit 528 controls the DC motor 26 by the PWM control method according to the output of the adding circuit 527. Since the PID control method is performed by a voltage outside the dead zone, the DC motor 26 is continuously driven.

Step S19: The CPU 501 stores the image data obtained by the scan in the image data storage unit 502a of the memory 502. If the capacity of the image data is greater than the capacity of the image data storage unit 502a, the image data may be transmitted and stored in the memory card M through the memory I/F 503 or may be stored in a storage device of the personal computer (not shown) through the external I/F. By this configuration, if the resolution is set to be high, the image data can be stored with certainty.

Figure 8:
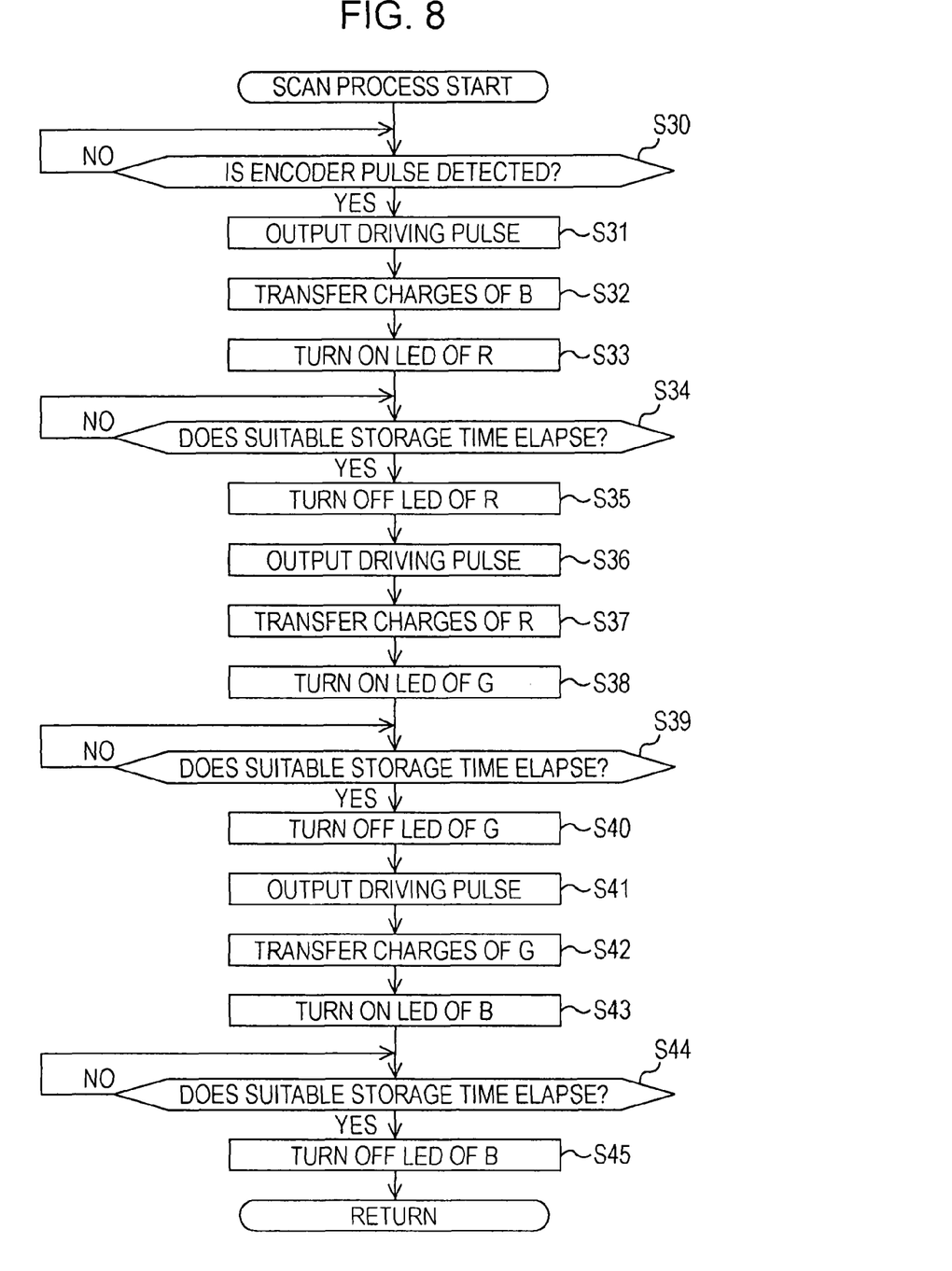
FIG. 8 is a flowchart showing an example of a scanning process shown in FIG. 5.

Next, the scan process of the "rotation and scan process" shown in the step S15 of FIG. 5 will be described in detail with reference to FIG. 8. The rotation process and the scan process are simultaneously performed, but the scan process will be first described and the rotation process will be then described. When the process shown in the flowchart of FIG. 8 starts, the following steps are performed.

Step S30: The CPU 501 determines whether the encoder pulse is detected by referring to the output of the encoder control unit 512. If the encoder pulse is detected, the process progresses to a step S31 and, if the encoder pulse is not detected, the same process is repeatedly performed.

Step S31: The image sensor control unit 511 supplies a driving pulse to the image sensor 30 and instructs the reading of the original. In more detail, the image sensor control unit 511 makes an image sensor driving pulse shown in FIG. 9 high. Thus, the image sensor 20 performs the following operation.

Figure 9:
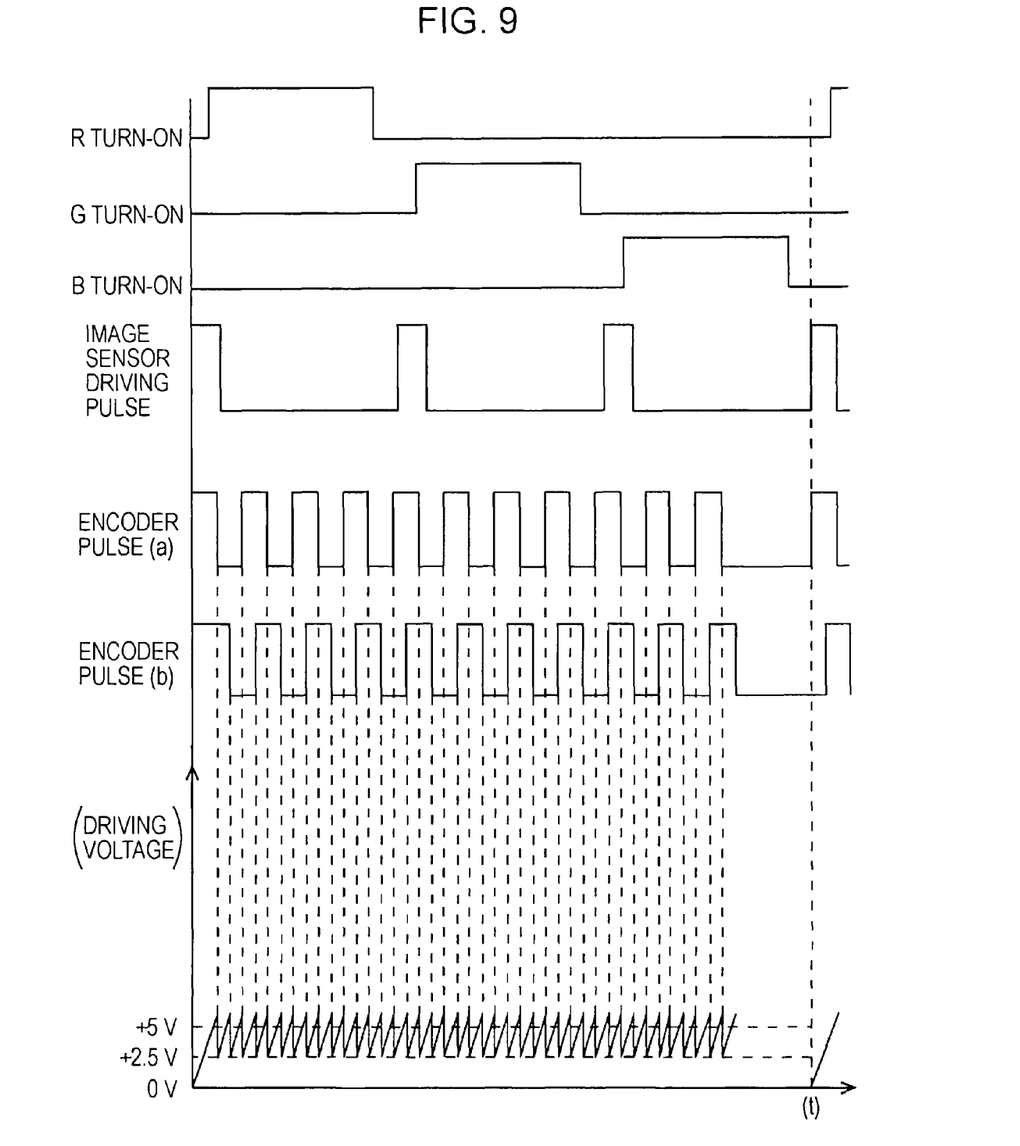
FIG. 9 is a view showing a driving signal of an LED.

In FIG. 9, three upper stages show timings for turning on the LEDs of R, G and B, and a next stage shows the image sensor driving pulse input to the image sensor 20. In addition, next stages show 2-phase encoder pulses output from the encoder 28. A lowest stage shows a driving voltage applied from the DC motor control unit 513 to the DC motor 26. The encoder pulses have two encoder pulses (a) and (b) shifted by $\pi/2$.

Step S32: The image sensor 20 transfers and outputs charges stored by turning on the LED of B (blue) in a previous period to the image sensor control unit 511. Accordingly, image data of one line corresponding to B is obtained.

S33: The image sensor control unit 511 turns on the LED of R (red) included in the carriage 14 (see FIG. 9). Thus, the light emitted from the LED of R is irradiated onto the original. The light reflected from the original is received by the light-receiving elements arranged in the image sensor 20 in a line and charges are stored in the light-receiving elements according to the intensity of the reflected light.

Step S34: The image sensor control unit 511 determines whether the suitable storage time elapses by referring to the timer 511a. If the suitable storage time elapses, the process progresses to a step S35 and, if the suitable storage time does not elapse, the same process is repeatedly performed. The suitable charge storage time is previously set as an ideal period for outputting a signal of one pixel in a period in which the light-emitting elements of the CCD receive the light and store charges (charge storage period).

Step S35: The image sensor control unit 511 turns off the LED of R (see FIG. 9). Accordingly, the light-receiving elements receive the light which is emitted from the LED of R and is reflected from the original during the time corresponding to the suitable storage time and stores the charges.

Step S36: The image sensor control unit 511 outputs the driving pulse to the image sensor 20. In more detail, the image sensor control unit 511 makes the image sensor driving pulse shown in FIG. 9 high.

Step S37: The image sensor 20 transfers and outputs charges stored by turning on the LED of R in the period of the steps S33 to S35 to the image sensor control unit 511. Accordingly, image data of one line corresponding to R is obtained.

Step S38: The image sensor control unit 511 turns on the LED of G (green) included in the carriage 14. Thus, the light emitted from the LED of G is irradiated onto and reflected from the original. The light reflected from the original is received by the light-receiving elements arranged in the image sensor 20 in a line and charges are stored in the light-receiving elements according to the intensity of the reflected light.

Step S39: The image sensor control unit 511 determines whether the suitable storage time elapses by referring to the timer 511*a*. If the suitable storage time elapses, the process progresses to a step S40 and, if the suitable storage time does not elapse, the same process is repeatedly performed.

Step S40: The image sensor control unit 511 turns off the LED of G. Accordingly, the light-receiving elements receive the light which is emitted from the LED of G and is reflected from the original during the time corresponding to the suitable storage time and stores the charges.

Step S41: The image sensor control unit 511 outputs the driving pulse to the image sensor 20. In more detail, the image sensor control unit 511 makes the image sensor driving pulse shown in FIG. 9 high.

Step S42: The image sensor 20 transfers and outputs charges stored by turning on the LED of G in the period of the steps S38 to S40 to the image sensor control unit 511. Accordingly, image data of one line corresponding to G is obtained.

Step S43: The image sensor control unit 511 turns on the LED of B (blue) included in the carriage 14. Thus, the light emitted from the LED of B is irradiated onto and reflected from the original. The light reflected from the original is received by the light-receiving elements arranged in the image sensor 20 in a line and charges are stored in the light-receiving elements according to the intensity of the reflected light.

Step S44: The image sensor control unit 511 determines whether the suitable storage time elapses by referring to the timer 511*a*. If the suitable storage time elapses, the process progresses to a step S45 and, if the suitable storage time does not elapse, the same process is repeatedly performed.

Step S45: The image sensor control unit 511 turns off the LED of B. Accordingly, the light-receiving elements receive the light which is emitted from the LED of B and is reflected from the original during the time corresponding to the suitable storage time and stores the charges. The charges stored by the Led of B are transferred in the following step S32.

Next, the rotation process of the rotation and scan process shown in the step S15 of FIG. 5 will be described with reference to FIG. 10. The rotation process shown in FIG. 10 corresponds to the above-described extremely low-speed rotation process. When the process shown in the flowchart of FIG. 10 starts, the following steps are performed.

Step S60: The DC motor control unit 513 reads a duty ratio increase rate from a register (not shown). The duty ratio increase rate indicates a degree that the duty ratio is increased with time. The DC motor control unit 513 gradually increases the duty ratio with the duty ratio increase rate while a time is measured by a timer (not shown).

Step S61: The DC motor control unit 513 determines whether an edge of the encoder pulse is detected and increases the duty ratio until it is determined that the edge is detected.

When the duty ratio is gradually increased with the duty ratio increase rate, as shown in FIG. 9, the driving voltage is gradually increased. If the driving voltage exceeds the dead zone (−5 V to +5 V), the stopped DC motor 26 is rotated. As a result, if the encoder pulse (a) is at a high level at a timing when the extremely low-speed rotation process starts, the encoder pulse (a) is changed from the high level to a low level. If the encoder pulse (a) is changed from the high level to the low level, the DC motor control unit 513 determines that the edge is detected and the process progresses to a step S62.

Step S62: The DC motor control unit 513 reads an end pulse number from the register and determines whether the pulse numbers of the encoder pulses (a) and (b) detected after the extremely low-speed rotation process starts reach the end pulse number. If the pulse numbers reach the end pulse number, the process progresses to a step S64 and, if the pulse numbers do not reach the end pulse number, the process progresses to a step S63.

Step S63: The DC motor control unit 513 reads the duty ratio of the dead zone from the register and decreases the duty ratio to the duty ratio of the dead zone. Then, the process progresses to the step S60 and the above-described process is repeatedly performed.

The duty ratio of the dead zone is the duty ratio corresponding to the driving voltage in the dead zone. As the duty ratio of the dead zone corresponding to the selected resolution in the sub-scan direction, the duty ratio corresponding to the driving voltage of +2.5 V is stored in the register. If the duty ratio is increased in the step S60, the driving voltage is gradually increased from +2.5 V. If the driving voltage exceeds the dead zone and becomes greater than +5 V, the DC motor 26 is rotated. At this time, as shown in FIG. 9, the encoder pulse (b) is changed from the high level to the low level.

Accordingly, the DC motor control unit 513 detects the edge of the encoder pulse (b). Even in the timing in which the edge is detected, since new encoder pulses (a) and (b) are not detected after the extremely low-speed rotation process, the DC motor control unit 513 performs the step S63 and decreases the duty ratio to the duty ratio of the dead zone.

When the steps S60 to S63 are repeatedly performed, the DC motor 26 are repeatedly rotated and stopped and the DC motor control unit 513 detects new encoder pulses (a) and (b). If it is determined that the detected pulse number reach the end pulse number in the step S62, the DC motor control unit 513 performs the step S64.

Step S64: The DC motor control unit 513 resets the duty ratio and stops the rotation of the DC motor 26.

As the result of the above-described extremely low-speed rotation process, as shown in FIG. 9, the DC motor control unit 513 receives, for example, 10 encoder pulses (a) and (b) in a period in which the steps S60 to S63 are repeatedly performed (hereinafter, referred to as an "extremely low-speed rotation period").

The duty ratio increase rate used in the step S202 is previously obtained by as an increase rate, in which a period necessary for rotating the DC motor 26 by 10 encoder pulses becomes 9 ms by the extremely low-speed rotation process, and is stored in the register. Accordingly, as shown in FIG. 9, after the extremely low-speed rotation period is completed, a next image sensor driving pulse is input, and a standby period of 1 ms occurs until the extremely low-speed rotation process starts. Since the DC motor 26 is stopped in the standby period, the DC motor control unit 513 receives 10 encoder pulses for 10 ms which is the sum of the extremely low-speed rotation period and the standby period.

Since the DC motor control unit 513 performs the above-described extremely low-speed rotation process whenever the image sensor driving pulse is received from the image sensor control unit 511, the DC motor 26 can be rotated by 10 encoder pulses at the input interval of the image sensor driving pulses of 10 ms. As a result, the image sensor 20 can read the original with predetermined resolution.

The standby period is a period which is provided such that the extremely low-speed rotation period is completed before a next image sensor driving pulse is input, although the extremely low-speed rotation period becomes longer than a predetermined length (9 ms) due to a variation in rotation of the DC motor 26.

As described above, according to the embodiment of the invention, since any one of the PID control method and the extremely low-speed rotation mode is selected as the method of controlling the DC motor 26 according to the resolution and the color mode, it is possible to control the DC motor 26 by an optimal control method according to the scan. Accordingly, since the DC motor 26 can be used in a wide speed range, the DC motor 26 can be used, instead of a stepping motor having a wide speed range and large operating sound.

The above-described embodiment is only exemplary and a variety of modified examples may be made. Although the DC motor 26 is controlled by changing the applied voltage as shown in FIG. 9 in the above-described embodiment, the DC motor 26 may be controlled by changing the current.

Although the extremely low-speed rotation control method or the PID control method is selected according to the resolution and the color mode in the above-described embodiment, the control method may be selected by referring to only the resolution.

Although the extremely low-speed rotation control method is employed in the whole section when the extremely low-speed rotation control method is selected in the above-described embodiment, a combination of the PID control method and the low-speed rotation control method may be used in one scan. For example, a time necessary for one scan may be 10 ms and, when the motor is rotated by 10 encoder pulses, the motor may be driven by 9 encoder pulses by the PID control method in an initial period of 1 ms (initial rotation period) and may be driven by 1 encoder pulse by the extremely low-speed rotation control method in a residual period of 9 ms (extremely low-speed rotation period). The initial rotation period may be less than or greater than 1 ms. In order to set the initial rotation period to be less than 1 ms, the initial pulse number is a value of 8 or less, such as 8 or 7, instead of "9". Alternatively, the DC motor 26 may be rotated by 9 encoder pulses in a shorter period by setting the initial duty ratio to a duty ratio corresponding to a voltage greater than the duty ratio corresponding to +22.5 V.

In order to set the driving time to be greater than 1 ms using the PID control method, the DC motor 26 may be rotated by 9 encoder pulses in a shorter period by setting the initial duty ratio to a duty ratio corresponding to a voltage less than the duty ratio corresponding to +22.5 V.

When the initial rotation period is small, the extremely low-speed rotation period becomes large. Accordingly, a value less than the above-described duty ratio increase rate is stored in the register and a speed for increasing the driving voltage is set to be low. Alternatively, the duty ratio of the dead zone may be set to be less than the above-described value such that a period before the rotation of the paused motor is started becomes large. In addition, if the initial rotation period is large, the setting contents are reversed compared with the case where the initial rotation period is small.

Although the duty ratio of the dead zone is the duty ratio corresponding to the driving voltage of +2.5 V in the above-described embodiment, the invention is not limited to this and the duty ratio of the dead zone may be the duty ratio corresponding to a voltage in the dead zone. For example, a duty ratio corresponding to +1 V or a duty ratio corresponding to +4 V may be used.

Since the driving voltage (or the driving current) is in the dead zone, the rotation of the DC motor 26 may be stopped. When the duty ratio of the dead zone is changed, the duty ratio increase rate is changed in order to set the extremely low-speed rotation period to 8 ms or 9 ms, like the above-described embodiment. That is, as the duty ratio increase rate according to the duty ratio of the dead zone, a value for allowing the extremely low-speed rotation period is 8 ms or 9 ms is previously obtained by measurement and is stored in the register.

Figure 10:
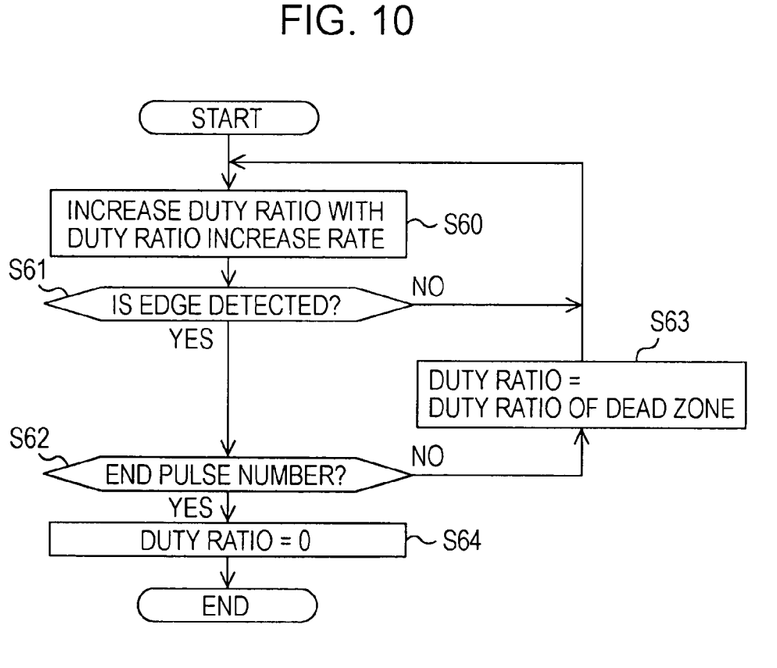
FIG. 10 is a flowchart showing an example of a rotation process shown in FIG. 5.

Although a constant value is used as the duty ratio of the dead zone in the step S61 of FIG. 10 in the above-described embodiment, the invention is not limited to this.

For example, the duty ratio of the dead zone may be calculated by multiplying the duty ratio when the edge is detected by a predetermined magnification ratio. In this case, since the duty ratio when the edge is detected is the duty ratio which exceeds a limit torque to start the rotation of the motor, the duty ratio when the edge is detected may be multiplied by the predetermined magnification ratio to set the duty ratio of the dead zone to a value which is slightly less than the limit torque such that the duty ratio is decreased to the duty ratio of the dead zone. It is possible to perform the extremely low-speed control without deteriorating throughput. The duty ratio of the dead zone may be calculated by subtracting a predetermined reduction amount from the duty ratio when the edge is detected.

Although the duty ratio is increased or the duty ratio is decreased to the duty ratio of the dead zone whenever the edge of the encoder pulse is detected in the above-described embodiment, the duty ratio may be increased or decreased whenever a predetermined number of edges, that is at least two edges, are detected.

Although a standby period of 1 ms is provided in the above-described embodiment, a predetermined charge storage period may be the extremely low-speed rotation period without providing the standby period.

Although the DC motor 26 which is subjected to the extremely low-speed rotation control method is a motor for transporting the carriage 14 included in the scanner device, the invention is not limited to this. By performing the above-described extremely low-speed rotation process with respect to a motor included in another device, it is possible to rotate the motor at a relatively small average rotation speed, compared with a case where a voltage outside the dead zone is applied as the driving voltage to continuously rotate the motor.

Although the operation in the multi-color mode is, for example, described in the above-described embodiment, any one of the LEDs of R, G and B is turned on and the charges stored in the image sensor 20 are output as image data, in the monochromatic mode. In more detail, in FIG. 9, for example, only the LED of R is turned on and the LEDs of G and B are not turned on. The charges which are stored by turning on the LED of R are transported when the LED of R is next turned on. Instead of the LED of R, only the LED of G may be turned on.

Although the LEDs of R, G and B are sequentially turned on to generate image data of R, G and B in the above-described embodiment, for example, a white cold-cathode tube or a LED may be turned to generate image data by the image sensors of 3 lines having filters of R, G and B.

Although the DC motor 26 to be controlled is a motor which is operated by DC power in the above-described embodiment, an AC motor may be used instead of the DC motor. In this case, the frequency of the driving voltage (current) applied to the AC motor is gradually increased such that the frequency of the AC motor exceeds the dead zone to rotate the AC motor. When the edge of the encoder pulse is detected, the frequency of the driving voltage is decreased to be in the dead zone.

Although the image sensor 20 is a CIS image sensor in the above-described embodiment, an optical reduction image sensor may be used instead of the CIS image sensor. Even in the optical reduction image sensor, since the scanner includes a motor for moving a carriage having a light source or a mirror, the motor can be rotated at an extremely low speed by performing the extremely low-speed rotation process. As a result, since the carriage can be transported at the extremely low speed, it is possible to obtain an image having higher resolution, compared with an image obtained by applying a voltage outside the dead zone as the driving voltage and continuously rotating the motor.

Although the DC motor control unit 513 controls the driving voltage using the PWM control method in the above-described embodiment, a pulse amplitude modulation (PAM) control method may be used instead of the PWM control method. A combination of the PWM control method and the PAM control method may be used.

Although a rotary encoder is used as an encoder in the above-described embodiment, other encoders such as a resolver or an encoder having a hall element may be used instead of the rotary encoder.

In the above-described embodiment, a portion of the configuration realized by hardware may be replaced with software. For example, the control of the applied voltage (PWM control), which is realized by a motor drive control unit (ASIC), may be realized by software.

What is claimed is:

1. A scanner device which scans a predetermined scan object and generates image data, the scanner device comprising:
    an image sensor that converts an optical image of the scan object into corresponding image data;
    a movement unit that moves a carriage having the image sensor in a sub-scan direction;
    a first control unit that controls the movement unit by a first control process;
    a second control unit that controls the movement unit by a second control process different from the first control process; and
    a selection unit that selects the first or the second control unit according to setting contents relating to a scan, wherein:
    the first control unit performs a control process according to a position of the carriage,
    the second control unit performs a control process according to the position and speed of the carriage; and
    the selection unit selects the first control unit when a motor included in the movement unit moves the carriage at a predetermined speed or less than the predetermined speed and selects the second control unit when the motor moves the carriage at less than the predetermined speed.

2. The scanner device according to claim 1,
    wherein the movement unit includes a DC motor for moving the carriage in the sub-scan direction.

3. The scanner device according to claim 1, wherein the selection unit selects the first and second control units according to a monochromatic/multi-color mode or resolution of the image data to be obtained.

4. A printing device comprising the scanner device according to claim 1.

5. A scanner device which scans a predetermined scan object and generates image data, the scanner device comprising:
    an image sensor that converts an optical image of the scan object into corresponding image data;
    a movement unit that moves a carriage having the image sensor in a sub-scan direction;
    a first control unit that controls the movement unit by a first control process;
    a second control unit that controls the movement unit by a second control process different from the first control process; and
    a selection unit that selects the first or the second control unit according to setting contents relating to a scan, wherein:
    the first control unit controls a motor included in the movement unit to be intermittently rotated;
    the second control unit controls the motor included in the movement unit to be continuously rotated; and
    the selection unit selects the first control unit when the motor included in the movement unit moves the carriage at a predetermined speed or less than the predetermined speed and selects the second control unit when the motor moves the carriage at less than the predetermined speed.

6. A scan method which scans a predetermined scan object and generates image data, the method comprising:
    selecting a first control process and a second control process different from the first control process according to setting contents relating to a scan;
    performing a control process which moves a carriage including an image sensor for converting an optical image of the scan object into corresponding image data;
    controlling a motor included in a movement unit with the first control process to be intermittently rotated;
    controlling the motor included in the movement unit with the second control process to be continuously rotated; and
    selecting the first control unit when the motor included in the movement unit moves the carriage at a predetermined speed or less than the predetermined speed and selects the second control unit when the motor moves the carriage at less than the predetermined speed.

* * * * *